(12) United States Patent
Liu et al.

(10) Patent No.: US 12,259,828 B2
(45) Date of Patent: *Mar. 25, 2025

(54) FORWARDING INCOMING IO TO SCM NAMESPACES

(71) Applicant: EMC IP Holding Company LLC, Hopkinton, MA (US)

(72) Inventors: Bing Liu, Tianjin (CN); Parmeshwr Prasad, Bangalore (IN); Rahul Deo Vishwakarma, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,058

(22) Filed: Dec. 4, 2023

(65) Prior Publication Data

US 2024/0104031 A1    Mar. 28, 2024

Related U.S. Application Data

(63) Continuation of application No. 17/305,630, filed on Jul. 12, 2021, now Pat. No. 11,836,095.

(30) Foreign Application Priority Data

May 27, 2021   (IN) .............................. 202111023660

(51) Int. Cl.
*G06F 13/16*     (2006.01)
*G06F 16/245*   (2019.01)
*G06N 20/00*    (2019.01)

(52) U.S. Cl.
CPC ........ *G06F 13/1668* (2013.01); *G06F 16/245* (2019.01); *G06N 20/00* (2019.01)

(58) Field of Classification Search
CPC .... G06F 13/1668; G06F 16/245; G06N 20/00
See application file for complete search history.

(56) References Cited

U.S. PATENT DOCUMENTS

| | | | |
|---|---|---|---|
| 11,836,095 B2 * | 12/2023 | Liu ....................... | G06F 16/245 |
| 2005/0102297 A1 | 5/2005 | Lloyd et al. | |
| 2011/0145363 A1 * | 6/2011 | Ananthanarayanan ...................... | |
| | | | G06F 16/172 |
| | | | 709/218 |
| 2014/0317332 A1 * | 10/2014 | Yang ................... | G06F 13/1673 |
| | | | 711/170 |

(Continued)

*Primary Examiner* — Henry Tsai
*Assistant Examiner* — John B Roche
(74) *Attorney, Agent, or Firm* — Workman Nydegger

(57) ABSTRACT

Techniques for intelligently routing IO to a storage class memory (SCM) namespace are disclosed. A configuration for a namespace is determined, where the configuration indicates a type of IO that the namespace is structured to handle. Details about the configuration of the namespace are stored in a repository. A forwarding rule is generated based on the namespace's stored configuration. When incoming IO having attributes similar to that type is received, implementation of the forwarding rule causes the incoming IO to be directed to the namespace. Attributes of a particular incoming IO are determined. As a result of the attributes satisfying a similarity threshold relative to the type, the forwarding rule is implemented such that the particular incoming IO is directed to the namespace.

20 Claims, 10 Drawing Sheets

(56) References Cited

U.S. PATENT DOCUMENTS

| | | | | |
|---|---|---|---|---|
| 2015/0074314 A1* | 3/2015 | Terada | ............... | G06F 13/1678 |
| | | | | 710/308 |
| 2016/0172020 A1* | 6/2016 | Baker | ................ | G06F 13/1668 |
| | | | | 710/308 |
| 2018/0260158 A1* | 9/2018 | Marripudi | ............. | G06F 3/0683 |
| 2020/0409559 A1* | 12/2020 | Sharon | ................... | G06F 3/064 |

* cited by examiner

FORWARDING INCOMING IO TO SCM NAMESPACES

FIELD OF THE INVENTION

Embodiments of the present invention generally relate to assigning input/output (IO) to namespaces. More particularly, at least some embodiments of the invention relate to systems, hardware, software, computer-readable media, and methods for forwarding, in real-time, IO to storage class memory (SCM) namespaces that are optimized to handle IO having different attributes.

BACKGROUND

Namespaces are commonly employed as an environment to hold identifiers that may each uniquely identify an object, such as a file for example. In some cases, a namespace may take the form of a data structure that holds a mapping of lookup keys to full keys, where the full keys may include, as one of their components, a file handle or filename. Namespaces can be used in a variety of scenarios in order to store and manage data.

One scenario where namespaces can be used is in the context of storage class memory (SCM). SCM can be used in a variety of access modes and a variety of different applications. Namespaces can be configured to provide an optimal performance environment for various workloads that are received from client applications. Unfortunately, it may be the case that incoming input/output (IO) may not be aware about the state of the available namespaces. What is needed, therefore is an improved mechanism for handling incoming IO that are to be managed by a namespace.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
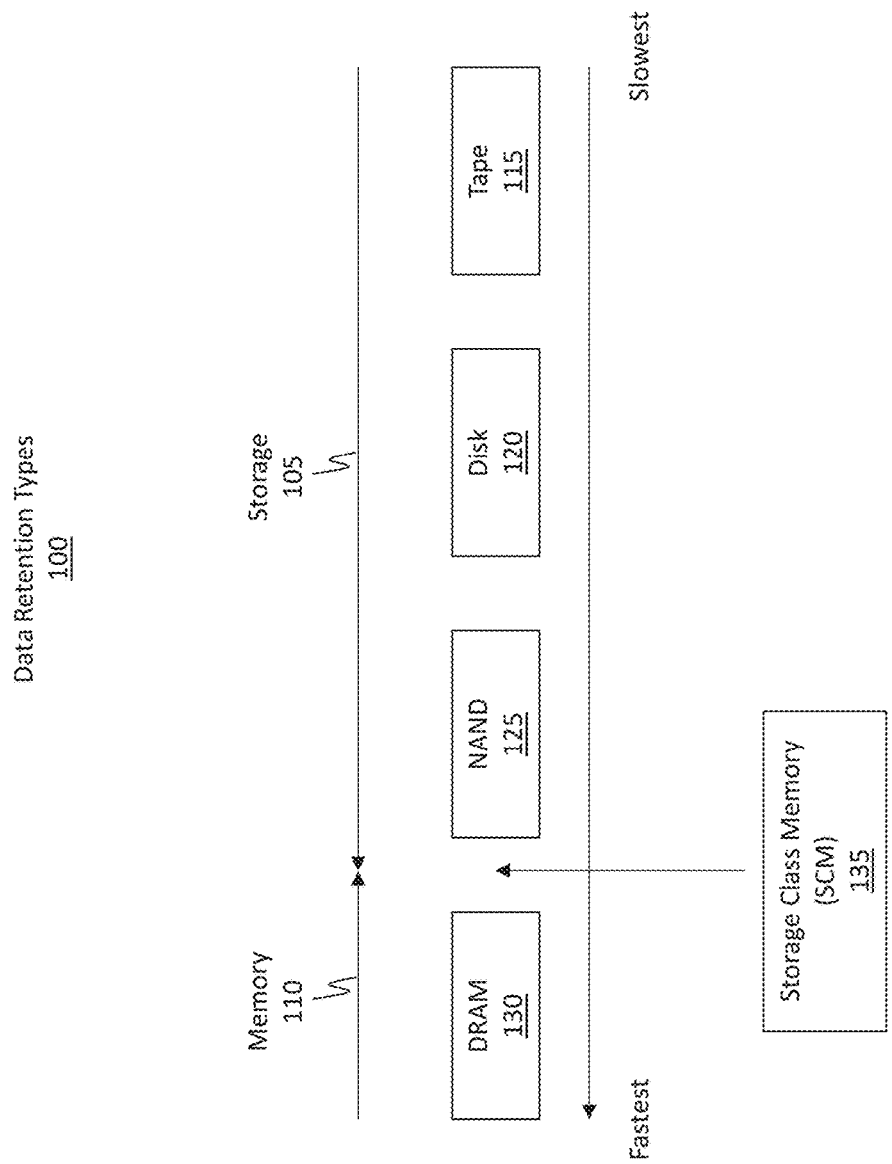
FIG. 1 illustrates different types of data retention techniques, including the use of storage class memory (SCM).

Embodiments disclosed herein relate to methods, systems, and devices (e.g., hardware storage devices, wearable devices, etc.) that direct input/output (IO) to specific storage class memory (SCM) namespaces, which are optimized or configured to handle IO having different attributes. As used herein, the term "optimized" (and its variants) refers to a namespace that is configured in a specific manner so as to perform specialized operations resulting in increased efficiency in terms of managing and handling IO. As a quick example, suppose certain IO has a size of 512 bytes. A particular namespace can be configured to specially handle IO that has a size of 512 bytes. Although the namespace might be able to handle IO of different sizes, the configuration of the namespace is designed such that the namespace can handle or manage the 512-sized IO more efficiently than IO having different sizes. As a result, this namespace is "optimized" to handle IO of a particular size. As compared to other namespaces that are configured differently, the selected namespace can be considered a "best fit" namespace as a result of its configuration or optimization. Accordingly, the term "optimized" refers to configuration settings of a namespace, where those configuration settings enable the namespace to more efficiently handle IO of a particular defined type or as having particular characteristics.

In some embodiments, namespace attributes for each SCM namespace included in a set of SCM namespaces are determined. The namespace attributes for each of the SCM namespaces are then stored in a database. In response to receiving network IO from a remote source, the embodiments determine IO attributes for the network IO. Based on the determined IO attributes for the network IO, the embodiments query the database to determine which specific SCM namespace in the set of SCM namespaces is a best fit namespace for managing incoming IO having the determined IO attributes. Notably, the process of determining which SCM namespace is the best fit to manage incoming IO is based on a comparison between the determined IO attributes and the namespace attributes stored in the database. Based on a result of querying the database, a particular SCM namespace from the set of SCM namespaces is selected to manage the network IO. This particular SCM namespace is selected as a result of determining the particular SCM namespace is the best fit namespace for the network IO as compared to other SCM namespaces in the set of SCM namespaces. The network IO is then redirected to the selected particular SCM namespace.

Some embodiments are configured to redirect an incoming IO to a particular SCM namespace based on a determination that the particular SCM namespace is optimized to handle IO having attributes that are common to attributes of the incoming network IO. For instance, some embodiments receive first IO from a first client application and second IO from a second client application. The embodiments determine first attributes associated with the first IO and second attributes associated with the second IO. Here, the first attributes include a pattern of workload behavior for the first client application, and the second attributes include a size of workloads for the second client application. The embodiments use the first attributes and the second attributes to query a lookup table comprising SCM namespace attributes for a set of SCM namespaces. The process of querying the lookup table includes (i) identifying a first SCM namespace optimized to handle IO having a similar pattern of workload behavior as the pattern of workload behavior associated with the first client application and (ii) identifying a second SCM namespace optimized to handle IO having a similar size of workloads as the size of workloads associated with the second client application. The embodiments select the first SCM namespace from the set of SCM namespaces to handle the first IO and select the second SCM namespace from the set of SCM namespaces to handle the second IO. The first IO is directed to the first SCM namespace, and the second IO is directed to the second SCM namespace.

Some embodiments are configured to determine a configuration for a namespace, where the configuration indicates a type of input/output (IO) that the namespace is structured to handle. Details about the configuration of the namespace are stored in a repository. The embodiments also generate a forwarding rule based on the namespace's stored configuration. When incoming IO having attributes similar to that type is received, implementation of the forwarding rule causes the incoming IO to be directed to the namespace. The embodiments also determine attributes of a particular incoming IO. As a result of the attributes satisfying a similarity threshold relative to that type, the embodiments implement the forwarding rule. As a consequence, the particular incoming IO is directed to the namespace.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about real and substantial benefits to the technical field. Specifically, the disclosed embodiments relate to techniques for intelligently redirecting incoming IO to namespaces that are configured to handle specific types of IO. For instance, a first namespace can be configured or optimized to handle IO having an "x" characteristic while a second namespace can be configured or optimized to handle IO having a "y" characteristic. In this example, assume a first IO is received, where that first IO has the "x" characteristic and a second IO is received, where that second IO has the "y" characteristic. In accordance with the disclosed principles, the embodiments are able to analyze the incoming IO to determine the IOs' characteristics. Once those characteristics are determined, then the embodiments can intelligently re-route, re-direct, or forward the IO to a specific namespace that is configured or optimized to handle IO having similar characteristics. In this example scenario, the embodiments would forward the first IO to the first namespace and would forward the second IO to the second namespace.

Here, the system as a whole will be benefitted because the first namespace is able to readily handle and manage the first IO. The first namespace likely would not be able to handle the second IO as well as the second namespace would be able to. With that understanding, the embodiments are able to forward the second IO to the second namespace in order to capture improved performance based on configuration settings of the various namespaces. Accordingly, the disclosed embodiments introduce intelligence into where and how IO is routed among various namespaces.

When the disclosed operations are implemented in the context of an SCM architecture, then significant improvements in computing speed and performance can be achieved. Furthermore, the disclosed embodiments provide a non-intrusive technique for redirecting IO to persistent memory namespaces based on resources, which process can be performed in a proportional manner relative to client needs. The embodiments can also beneficially perform various prediction techniques to predict future behavior of client applications and devices and can perform the disclosed forwarding operations based on those predictions.

If attempts are made to reconfigure (using traditional techniques) the SCM to improve performance, then it is often the case that older data will be lost. Furthermore, backing up the data on a namespace for reconfiguration is a prohibitively costly operation. Additionally, traditional techniques that attempt to effectively use SCM in a specific environment also present challenging tasks. For instance, in traditional systems, IO had to be guided to the right namespace, and static tools were not available to handle such scenarios. The disclosed embodiments, on the other hand, address these issues and provide solutions to those problems. Beneficially, the embodiments are able to map incoming IO to a corresponding SCM namespace. The embodiments can facilitate this mapping based on different attributes of the IO, perhaps such as block size characteristics (among many others). The embodiments also enable various parameters to promote boosts to bandwidth and to reduce latency. Accordingly, these and numerous other benefits will be described in more detail throughout the remaining portions of this disclosure.

Data Retention

Attention will now be directed to FIG. 1, which illustrates various data retention types 100 categorized as storage 105 and memory 110. Generally, storage 105 refers to techniques for persistently retaining data (e.g., non-volatile storage, such as the ability to retain data even when power is shut off) while memory 110 refers to temporary or volatile storage (e.g., data is not retained when power is shut off). The storage 105 techniques include, but certainly are not limited to, storage using physical tape 115, disk 120, and NAND 125. The memory 110 techniques include, but are not limited to, DRAM 130 (dynamic random access memory). FIG. 1 also shows the average access speeds of these different data retention techniques, where tape 115 is on the slower end and where DRAM 130 is on the faster end.

Recently, a new type of storage technique has emerged and is referred to as storage class memory (SCM) 135. SCM 135 is a type of storage technique that uses flash-based NAND. As shown in FIG. 1, SCM 135 is an intermediary between DRAM 130 and NAND 125. SCM 135 is a type of physical memory space that is implemented near the underlying computer system's central processing unit (CPU). As a consequence of being near the CPU, data can be processed very quickly and can be accessed very quickly. SCM 135 can also process data in a more granular form, such as in bytes instead of only in blocks. SCM 135 is also a form of persistent memory, so the data is retained even when power is shut off.

Namespaces

Data can be arranged in an SCM environment in various different ways. One example technique for arranging data in an SCM environment is through the use of namespaces.

Figure 2:
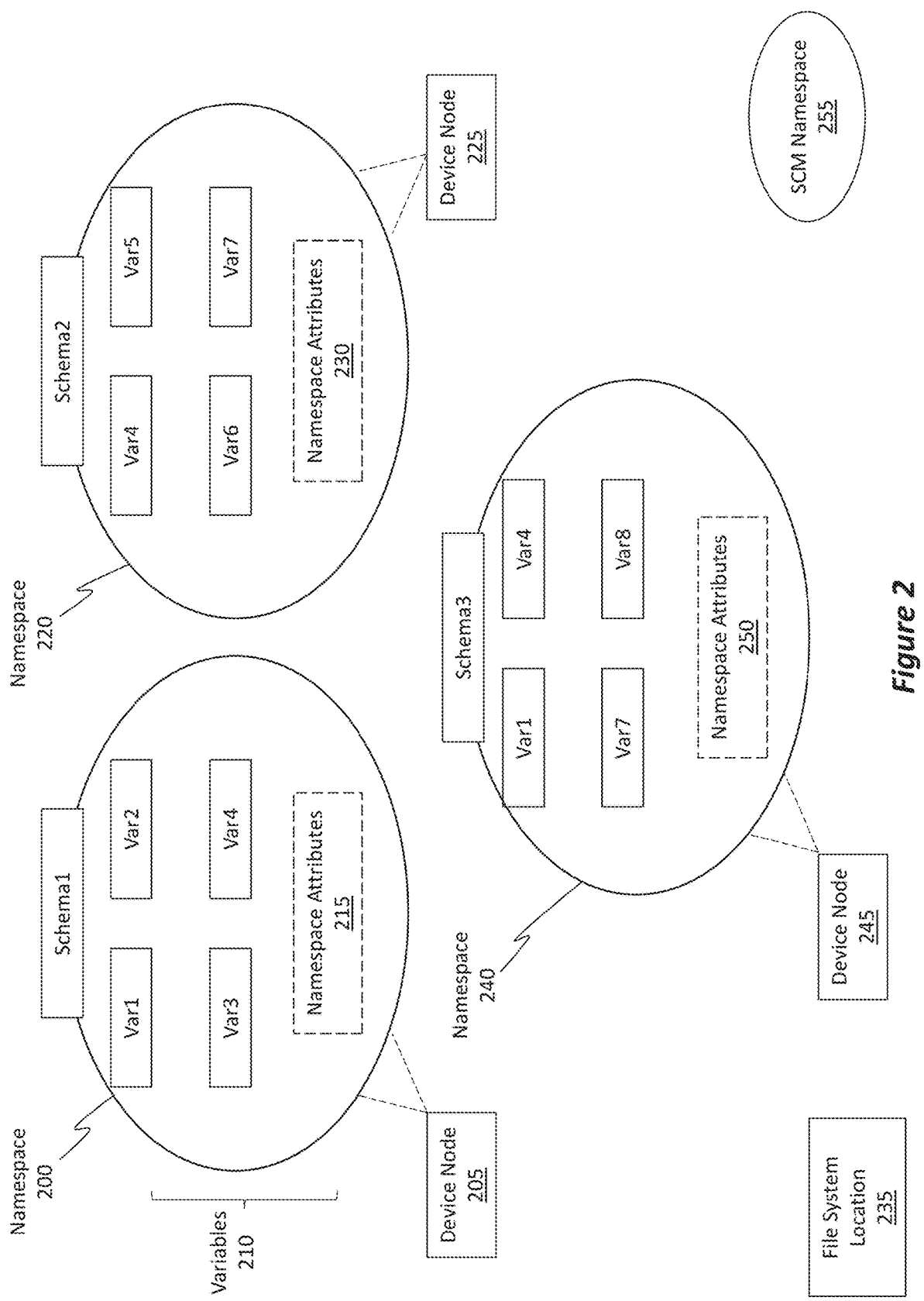
FIG. 2 illustrates how namespaces can be used to store and manage data and how those namespaces can be configured in a manner to handle different types of data.

Generally, a "namespace" refers to a declarative region or a set of signs that provide scope to a set of identifiers, such as in the case where the signs are used to differentiate and identify objects of varying kinds. Namespaces are a type of storage structure or technique that provides hierarchical organization to data that is to be stored. One benefit of namespaces relates to the ability to reuse the same naming convention in a different hierarchy. FIG. 2 is illustrative.

Figure 3:
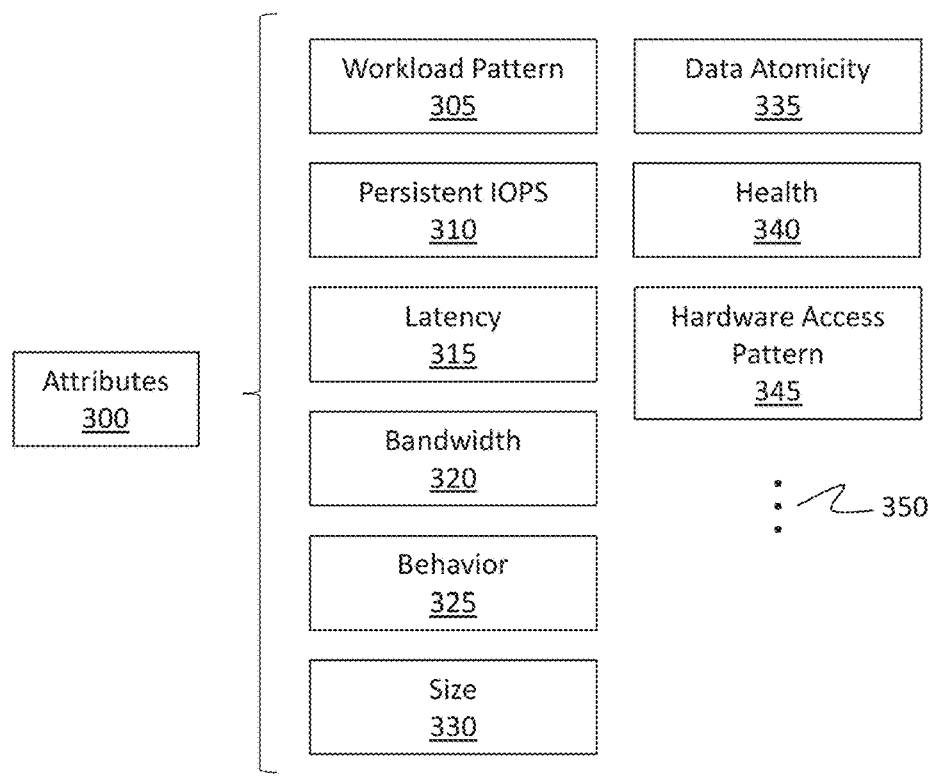
FIG. 3 illustrates various attributes associated with namespaces.

FIG. 2 shows a namespace 200 (also labeled as "Schema1") that can be mounted or located on a particular device node 205, such as a server. The namespace 200 is shown as including a number of variables 210, such as "Var1," "Var2," "Var3," and "Var4." Of course, any number of variables can be included in the namespace 200, and four is just one example. Here, the namespace 200 is configured to have various namespace attributes 215. FIG. 3 provides some additional clarification regarding the namespace attributes 215.

Specifically, FIG. 3 shows attributes 300, which are representative of the namespace attributes 215 of FIG. 2. The attributes 300 detail characteristics, properties, or features of a namespace and potentially how that namespace is configured or for which type of IO the namespace is optimized to handle.

In FIG. 3, the attributes 300 include a workload pattern 305, a persistent input/output operations per second IOPS 310, a latency 315, a bandwidth 320, a behavior 325, a size 330, a data atomicity 335, a health 340, and a hardware access pattern 345. The ellipsis 350 illustrates how other features can be included in the attributes 300.

The workload pattern 305 can describe what types of workloads or what types of workload frequencies a given namespace might be configured to handle. For instance, a namespace might be configured to support a boosted or increased amount of processing cycles during a certain time of day and have fewer cycles during other parts of the day such that increased data can be managed by the namespace during those busy time cycles as compared to the not-busy time cycles. The workload pattern 305 can reflect such timing aspects and can also reflect patterns by which workloads are received from different client applications.

The persistent IOPS 310 reflects functionality related to writing and reading operations available to a namespace or to a client application. The latency 315 reflects how long certain operations might take for a namespace and/or for a client application. The bandwidth 320 refers to how much data can be transmitted over a given time period for a namespace or client application. The behavior 325 is similar to the workload pattern 305 but provides additional details regarding the functional operations of the namespace and/or the client application. The size 330 refers to how much data a namespace is configured to handle, such as the byte size. Data can be categorized based on data atomicity 335, traffic optimized IO, health 340 (e.g., of the client device, client application, or perhaps a node hosting the namespace), and hardware access pattern 345. These features can be viewed as being static configurations of the SCM hardware. In some cases, namespaces can be segregated based on the above-described characteristics or attributes 300.

As indicated previously, one of the guidelines or parameters for deciding where incoming IO should be directed to (e.g., which specific namespace) can include health (e.g., health 340) consideration-based forwarding. To illustrate, the embodiments can acquire the health of the SCM installed in a particular system. By way of example and not limitation, the embodiments can acquire this information from a "ndctl output" command. Namespaces residing on healthy SCMs can hold high priority IO. Healthy SCMs will have better performance and reliability. The health 340 can include information such as the temperature of the device node, a health status of the device node, alarm statuses, memory usage, processor usage, and so forth.

Another one of the guidelines, as reflected above, is related to traffic optimized IO forwarding. Here, a SCM system has a hardware controller that can manage traffic. The embodiments can categorize SCM that are determined to be idle. Moving IO to idle SCM can potentially optimize or improve client IO performance.

Another optional guideline relates to flush optimized forwarding. In some cases, Devdax SCM configurations can support a fast way of data movement. A particular namespace can be selected based on flushing properties of the IO stream. That is, data in the IO stream can be flushed to media, and those flushing properties can be considered when selecting or configuring a namespace. A namespace configured to consider flushing properties can beneficially reduce data commit time significantly.

Data atomicity-based forwarding is another guideline. Notably, the sector mode of a configuration can support power-fail atomicity. Customers who are more concerned about data loss can use specially configured namespaces to accommodate data atomicity requirements.

Returning to FIG. 2, namespace 220 is also illustrated. Namespace 220 is hosted or mounted on device node 225. Namespace 220 is also labeled as "Schema2" and includes the following variables: "Var4," "Var5," "Var6," and "Var7." Notice, the variable name "Var4" overlaps or is common with the "Var4" from the namespace 200. Despite this overlap, the two variables are distinct and refer to different units of data as a result of them being included in different namespaces.

A set of namespace attributes 230, such as those described in FIG. 3, are also provided for the namespace 220. The namespace attributes 230 can be different than the namespace attributes 215. Furthermore, the namespace 220 can refer to a different file system location 235 than the namespace 200.

FIG. 2 also shows namespace 240 (labeled as "Schema3"), which includes "Var1," "Var4," "Var7," and "Var8." Here, "Var1" overlaps with "Var1" in namespace 200, but those two refer to different file system locations. Similarly, "Var4" overlaps with "Var4" in both namespace 200 and namespace 220, but those three variables refer to different units of data despite the use of the common variable name.

Namespace 240 is mounted on device node 245. Furthermore, namespace 240 is associated with its own set of namespace attributes 250.

Each of the different namespaces can be configured to handle different types of data. That is, each namespace can have a configuration that is structured or "optimized" to handle a particular type or types of data/IO. Consider the following analogy. A general-purpose processor can be configured to handle essentially any type of data. An application specific integrated circuit (ASIC) or a graphics processing unit (GPU), on the other hand, are specifically programmed or configured to handle, in an efficient and optimized manner, specific types of data. Therefore, similar to how a GPU is "optimized" to handle image and video-type content, a namespace can be "optimized" to handle specific types of IO.

Figure 4:
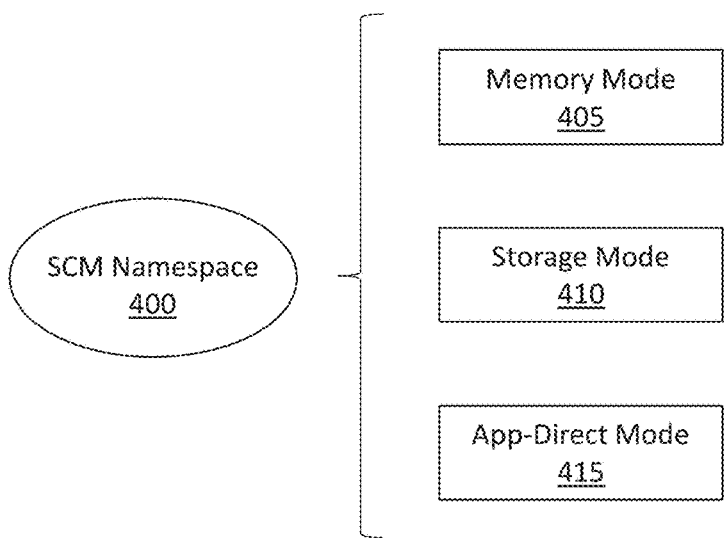
FIG. 4 illustrates various modes in which namespaces, particularly SCM namespaces, can be used.

FIG. 2 also illustrates how the namespaces 200, 220, and 240 can be a form of a SCM namespace 255. That is, those namespaces can be configured in a SCM environment. Additionally, FIG. 4 shows how the SCM namespace 400, which is representative of the namespaces mentioned thus far, can operate in different modes.

These modes include a memory mode 405, a storage mode 410, and even an app-direct mode 415. The memory mode 405 can support memory-based storage techniques, such as DRAM memory. The storage mode 410 can support storage-based techniques, such as legacy file system storage. The app-direct mode 415 is a mode explicitly exposed to applications. Accordingly, SCM namespaces are highly versatile and can be used in various different modes.

Example Architectures for Intelligently Directing IO to SCM Namespaces

Figure 5:
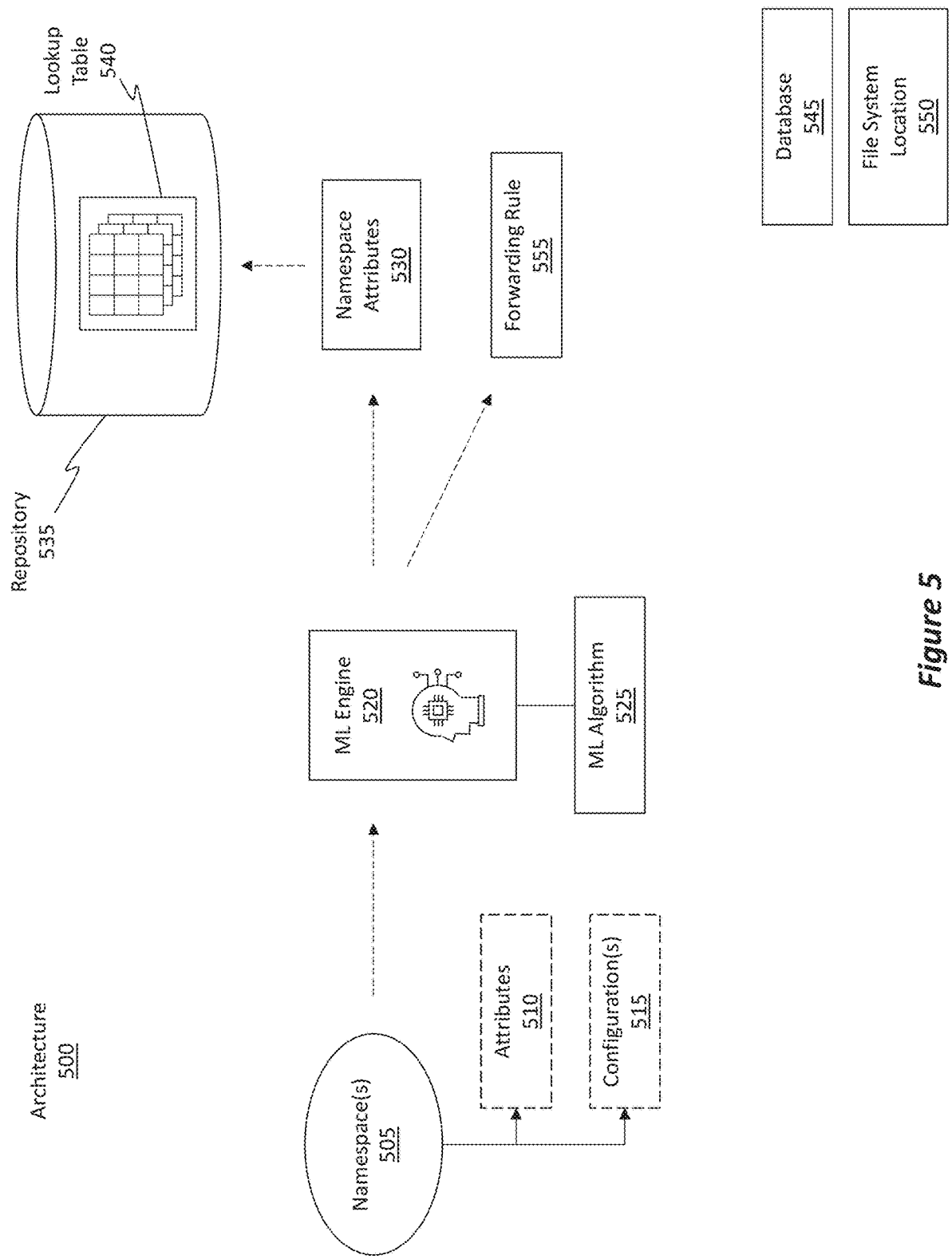
FIG. 5 illustrates an example architecture in which a machine learning (ML) engine is used to analyze namespaces to determine their attributes or characteristics.

FIG. 5 shows an example architecture 500 that is configured to facilitate dynamically redirecting or forwarding IO to specific namespaces. The architecture 500 includes a set of namespace(s) 505, such as those discussed previously, where these namespace(s) 505 have a set of attributes 510 and configuration(s) 515 to implement those attributes 510.

The architecture 500 also includes a machine learning (ML) engine 520 that includes or has access to a ML algorithm 525 (e.g., perhaps a Markov Transition State machine learning algorithm). As used herein, reference to "machine learning" or to a ML model or to a "neural network" may include any type of machine learning algorithm or device, neural network (e.g., convolutional neural network(s), multilayer neural network(s), recursive neural network(s), deep neural network(s), dynamic neural network(s), etc.), decision tree model(s) (e.g., decision trees, random forests, and gradient boosted trees), linear regression model(s) or logistic regression model(s), support vector machine(s) ("SVM"), artificial intelligence device(s), Markov transition state or Markov chain, or any other type of intelligent computing system. Any amount of training data may be used (and perhaps later refined) to train the machine learning algorithm to dynamically perform the disclosed operations.

Here, the ML engine 520 analyzes the namespace(s) 505 to determine the attributes 510 of those namespaces, as reflected by the namespace attributes 530. The namespace attributes 530 will be substantially the same or similar to the attributes 510. These namespace attributes 530 can then be stored in a repository 535, such as in a lookup table 540 and/or any type of database 545. The repository 535 can also include the file system location 550 information for the namespace(s) 505.

In addition to learning or determining the namespace attributes 530 of the namespace(s) 505, the ML engine 520 can also generate a set of forwarding rules, as shown by forwarding rule 555. That is, when an incoming IO is received, the forwarding rule 555 can be implemented in order to automatically direct or forward that incoming IO to a corresponding namespace. Further details on this forwarding aspect will be provided later, but a quick example will be helpful. Suppose an incoming IO has an "x" characteristic and a first namespace is configured to handle IO having the "x" characteristic or a characteristic that is within a similarity threshold to the "x" characteristic. A forwarding rule may have been generated where, when the forwarding rule is implemented, the rule automatically causes the incoming IO to be transmitted or forwarded to the first namespace. That forwarding rule was generated based on the learned or determined namespace attributes 530. Accordingly, the architecture 500 can be considered as a platform or framework for analyzing namespaces and for generating forwarding rules to enable the automatic rerouting of incoming IO to namespaces that are optimized to handle such IO.

Figure 6:
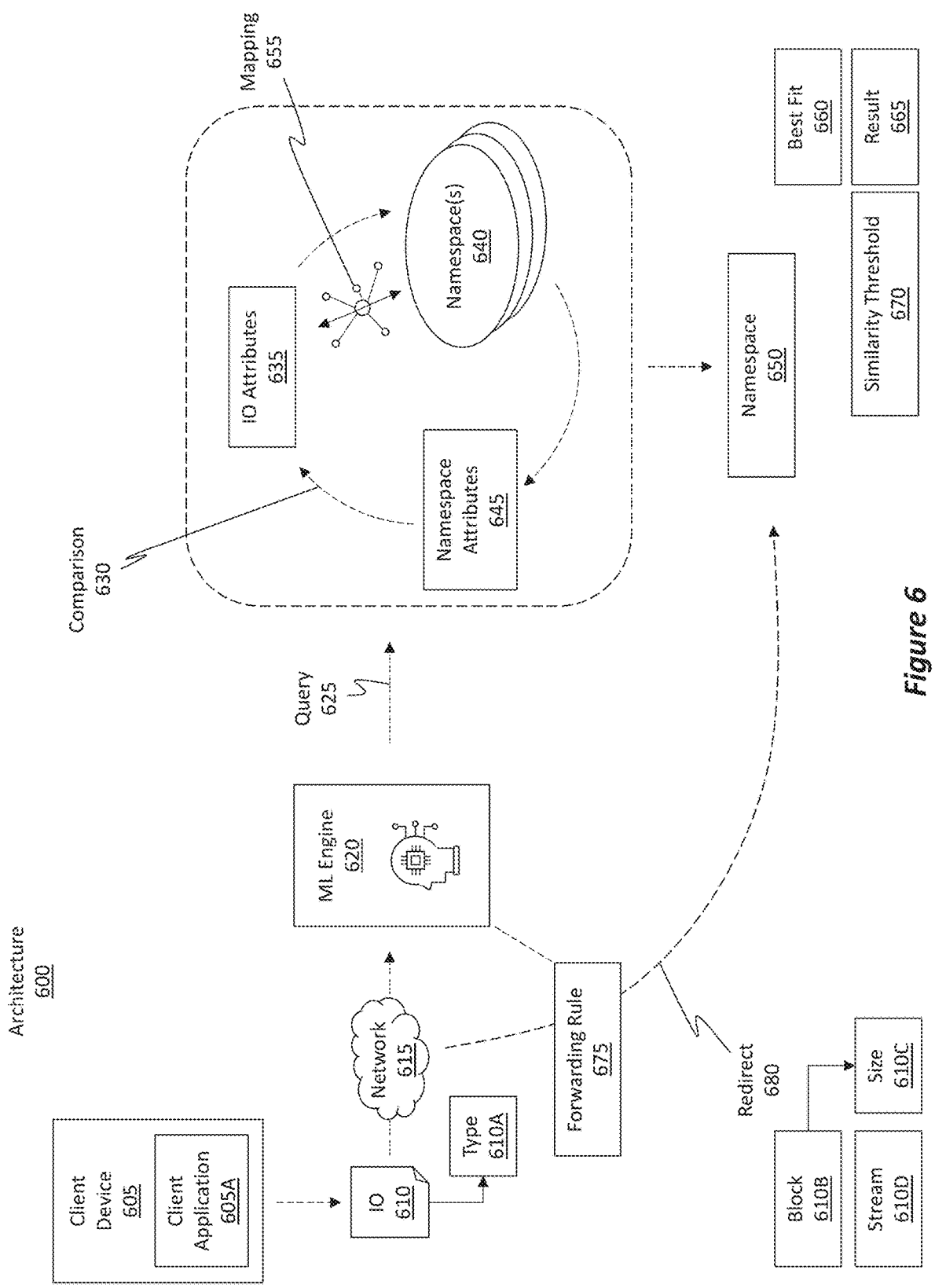
FIG. 6 illustrates an example architecture where a ML engine analyzes incoming IO and then selects a corresponding namespace that is a best fit for handling that particular type of IO.

FIG. 6 shows another architecture 600, which can be an add-on or extension to the architecture 500 of FIG. 5. Specifically, the architecture 600 includes a client device 605 hosting a client application 605A. The client application 605A generates and transmits IO 610. Notice, in FIG. 6, the IO 610 is of a particular type 610A (e.g., it has a particular size, it is included in a particular workload, it has specific properties, etc.).

In some cases, the IO 610 can be transmitted in the form of a block 610B having a particular size 610C. In some cases, the IO 610 can be included as a part of a stream 610D.

In any event, the IO 610 is transmitted over a network connection, as shown by network 615, and is received or intercepted by a ML engine 620. The ML engine 620 can be the same ML engine 520 of FIG. 5 or it can be a unique and distinct engine. The ML engine 620 analyzes the IO 610 to determine its properties and attributes.

After the ML engine 620 determines the properties or attributes of the IO 610, the ML engine 620 can use those attributes in order to conduct a query 625 on the repository 535 of FIG. 5, such as by consulting the lookup table 540 or any other database 545. Specifically, the ML engine 620 performs a comparison 630 between the IO attributes 635 of the IO 610 (as determined by the ML engine 620), the namespace(s) 640 (e.g., the namespace(s) 505 that were analyzed), as well as the namespace attributes 645 (e.g., the namespace attributes 530). This comparison 630 is performed in order to determine which specific namespace is best suited or optimized to handle IO data having characteristics that match or that are sufficiently similar to the type 610A of the IO 610, or rather sufficiently similar to the IO attributes 635.

Based on the comparison 630, the ML engine 620 can identify a particular namespace 650 that is configured, or rather that is optimized, to handle IO having the IO attributes 635. In this regard, the namespace 650 is considered to be a "best fit" match for the IO 610. By way of additional clarification, suppose there are "n" number of available namespaces, with each namespace being configured or structured in a particular manner. The IO 610 is received. The ML engine 620 is able to analyze the attributes of the IO 610 and the attributes of the "n" different namespaces. The ML engine 620 can identify a specific one namespace among the "n" different namespaces, where that specific namespace has been configured in a manner that is best suited to handle the IO 610 based on the IO 610's attributes.

In this sense, the embodiments are able to generate a mapping 655 between IO attributes 635 and namespace attributes 645. Accordingly, the namespace 650 is selected as a result of it being a best fit 660 namespace for handling the IO 610, such that the namespace 650 is the result 665 of performing the comparison 630 and the query 625.

As indicated above, it may be the case that there is not a perfect alignment or match between the IO 610 and any specific one of the namespace(s) 640. That is, suppose a namespace is configured to handle a type "x" IO, but the IO 610 is of a type "x'," where the prime indicator indicates a slight difference between the attributes of the IO 610 and exemplary IO that the namespace handles. If the difference between the actual attributes of the IO 610 and the attributes of an exemplary IO handled by a namespace are within a designated similarity threshold 670 (i.e. the received IO is sufficiently similar to IO handled by a specific namespace), then the ML engine 620 will still select the namespace to handle the received IO despite differences existing between the received IO and exemplary IO normally handled by the namespace.

In any event, the ML engine 620 can then trigger the use of a forwarding rule 675, which is one of the forwarding rules mentioned in FIG. 5 (e.g., forwarding rule 555), to redirect 680 the IO 610 to the namespace 650. Implementation of the forwarding rule 675 causes the IO 610 to be automatically forwarded or directed to the namespace 650 so the namespace 650 can then handle and manage the IO 610.

Additionally, the disclosed embodiments are beneficially able to analyze incoming data from network traces from clients and estimate the future IO behavior using Markov Transition States. In some cases, the embodiments periodically benchmark existing persistent memory IOPS, latency, and/or bandwidth with respect to different SCM modes. The embodiments can also store the benchmarked data to a specific location. Based on client IO behavior, the embodiments can move the traffic to the optimal, the best suited, or the "best fit" SCM namespace. For various time intervals, the embodiments can predict future IO behavior and re-look or re-examine the persistent memory namespace configurations (e.g., configuration parameters) to perform the above-described steps.

Accordingly, in some embodiments, incoming IO can be categorized in data atomicity, hardware access pattern, traffic optimized IO, and optionally even health based forwarding. The above features are some of the static configurations that are available for SCM hardware. Namespaces can be segregated based on these characteristics. A lookup table can be created and can be stored in a predefined location. The embodiments can then analyze incoming IO and create a forwarding rule. IO pattern and future behavior can be analyzed using a Markov Transition State algorithm. After analyzing the data, then the embodiments can perform the task of mapping forwarding rules with the lookup namespace table in order to trigger the redirection of incoming IO.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
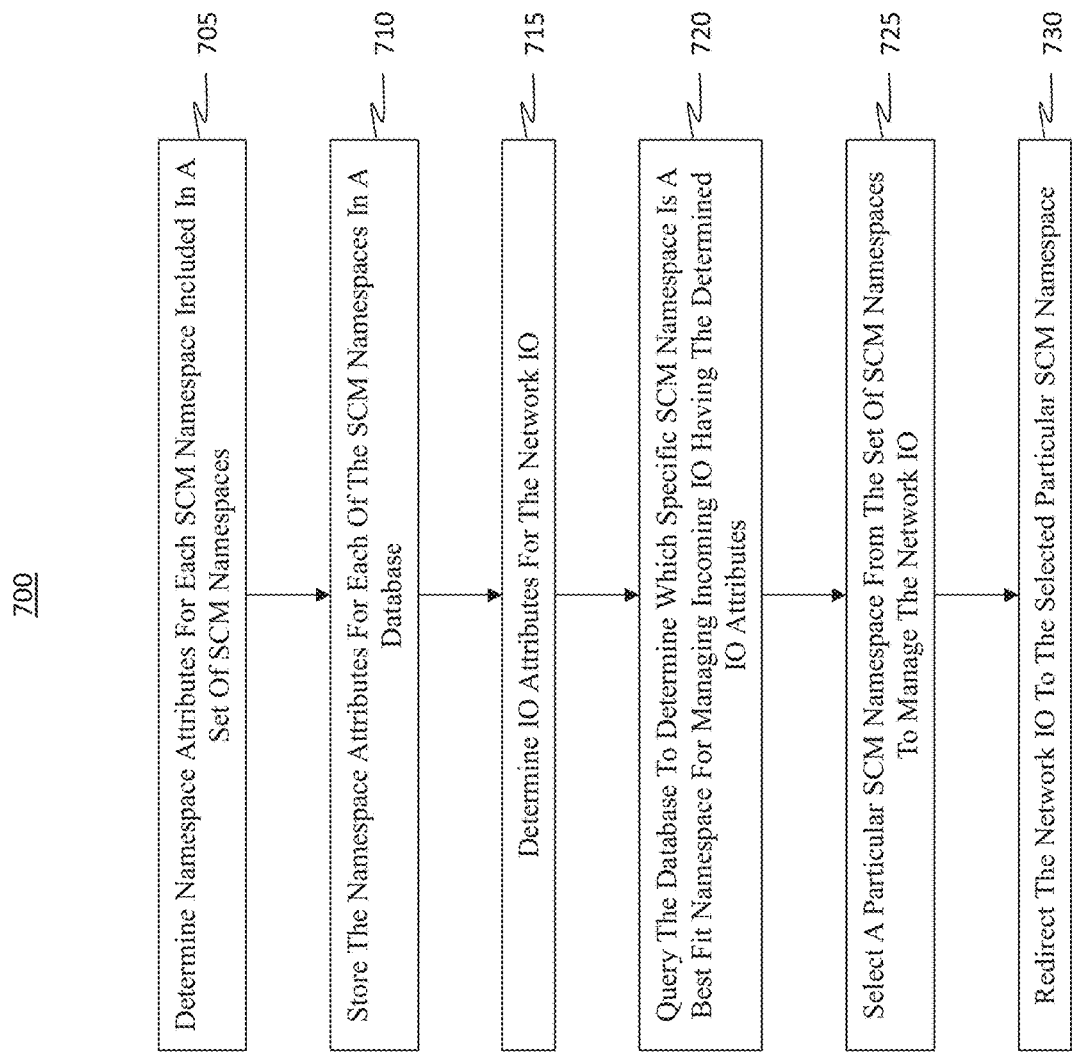
FIG. 7 illustrates a flowchart of an example method for forwarding, in real-time, IO to SCM namespaces that are optimized to handle IO having different attributes.

Attention will now be directed to FIG. 7, which illustrates a flowchart of an example method 700 for forwarding, in real-time, IO to SCM namespaces that are optimized to handle IO having different attributes. Method 700 can be implemented in the architecture 500 of FIG. 5 and the architecture 600 of FIG. 6.

Initially, method 700 includes an act (act 705) of determining namespace attributes for each SCM namespace included in a set of SCM namespaces. As an example, the ML engine 520 of FIG. 5 can analyze a set of SCM namespaces (e.g., namespace(s) 505) to determine the namespace attributes 530.

Optionally, the SCM namespaces support memory modes, storage modes, and even app-direct modes. In some cases, the namespace attributes that are stored in the database include one or more of: persistent memory input/output operations per second (IOPS) for the SCM namespaces, latency for the SCM namespaces, and/or bandwidth for the SCM namespaces.

Method 700 also includes an act (act 710) of storing the namespace attributes for each of the SCM namespaces in a database. For example, the ML engine 520 can store the namespace attributes 530 in the repository 535, which can be a database 545 or perhaps some kind of lookup table 540.

In response to receiving network IO from a remote source, act 715 involves determining IO attributes for the network IO. With reference to FIG. 6, the IO 610 can be received, and the ML engine 620 can determine the IO attributes 635 of the IO 610 (i.e. determining the IO attributes for the network IO can be performed using a machine learning algorithm). In some implementations, the incoming IO can be in the form of a block. That block can have any size. Optionally, the size of the block can be one of 256 bytes, 512 bytes, 1024 bytes, 2048 bytes, 4 k bytes, or even more than 4 k bytes. In some cases, the incoming IO can be in the form of a stream.

Based on the determined IO attributes for the network IO, act 720 involves querying the database to determine which specific SCM namespace in the set of SCM namespaces is a best fit namespace for managing incoming IO having the determined IO attributes. The ML engine 620 of FIG. 6 can perform the query, as shown by query 625. The process of determining which SCM namespace is the best fit to manage incoming IO having the determined IO attributes is based on a comparison (e.g., comparison 630) between the determined IO attributes and the namespace attributes stored in the database. Optionally, the process of determining which specific SCM namespace is optimized for managing incoming IO having the determined IO attributes is further based on client application behavior for a client application that transmitted the network IO.

Based on a result of querying the database, act 725 involves selecting a particular SCM namespace from the set of SCM namespaces to manage the network IO. To illustrate, the ML engine 620 performed the comparison 630 and determined that the namespace 650 was best equipped or best suited to handle the IO 610. In this regard, the particular SCM namespace mentioned in act 725 is selected as a result of determining the particular SCM namespace is the best fit namespace for the network IO as compared to other SCM namespaces in the set of SCM namespaces.

In some cases, the selected SCM namespace was selected based on an identified workload pattern associated with a client application that provided the network IO. For instance, the selected namespace may be configured to handle workload patterns that are commonly or routinely performed by the client application that transmitted the IO. As a consequence, that particular namespace was selected because it can handle those types of loads and IO.

Act 730 then involves redirecting the network IO to the selected particular SCM namespace. For instance, the ML engine 620 implements the forwarding rule 675, which causes the IO 610 to be redirected or forwarded to the namespace 650.

Figure 8:
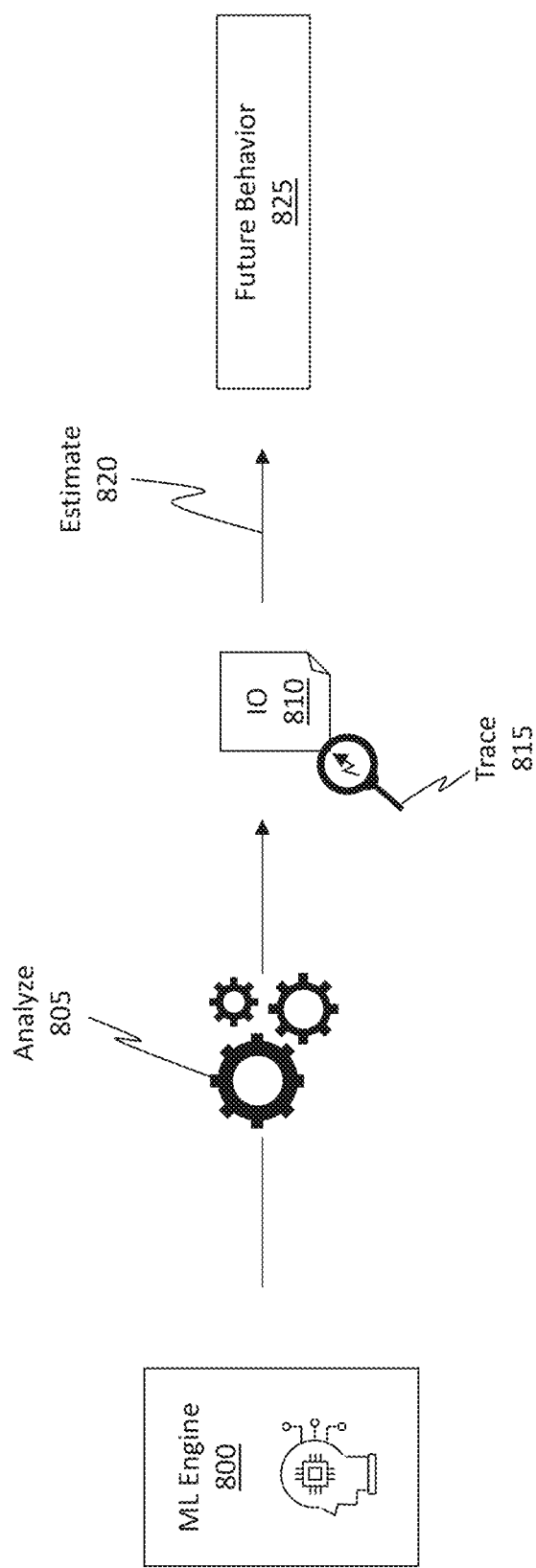
FIG. 8 illustrates a scenario where a ML engine can analyze traces of IO to generate an estimate or prediction regarding the future behavior of a client device or application.

In some cases, the disclosed embodiments analyze incoming IO from network traces and estimate future IO behavior using a machine learning algorithm. FIG. 8 is illustrative.

FIG. 8 shows an ML engine 800, which can be any of the ML engines mentioned previously. The ML engine 800 can analyze 805 incoming IO 810 from a network trace 815. Based on that analysis as well as potentially based on historically collected data, the ML engine 800 can generate a prediction or can estimate 820 future behavior 825 of a client application or client device that transmitted the IO 810. The embodiments can then trigger the generation of a new namespace specially configured to handle IO from that source or, alternatively, can configure an existing namespace to better handle the incoming IO based on the predicted future behavior 825.

Figure 9:
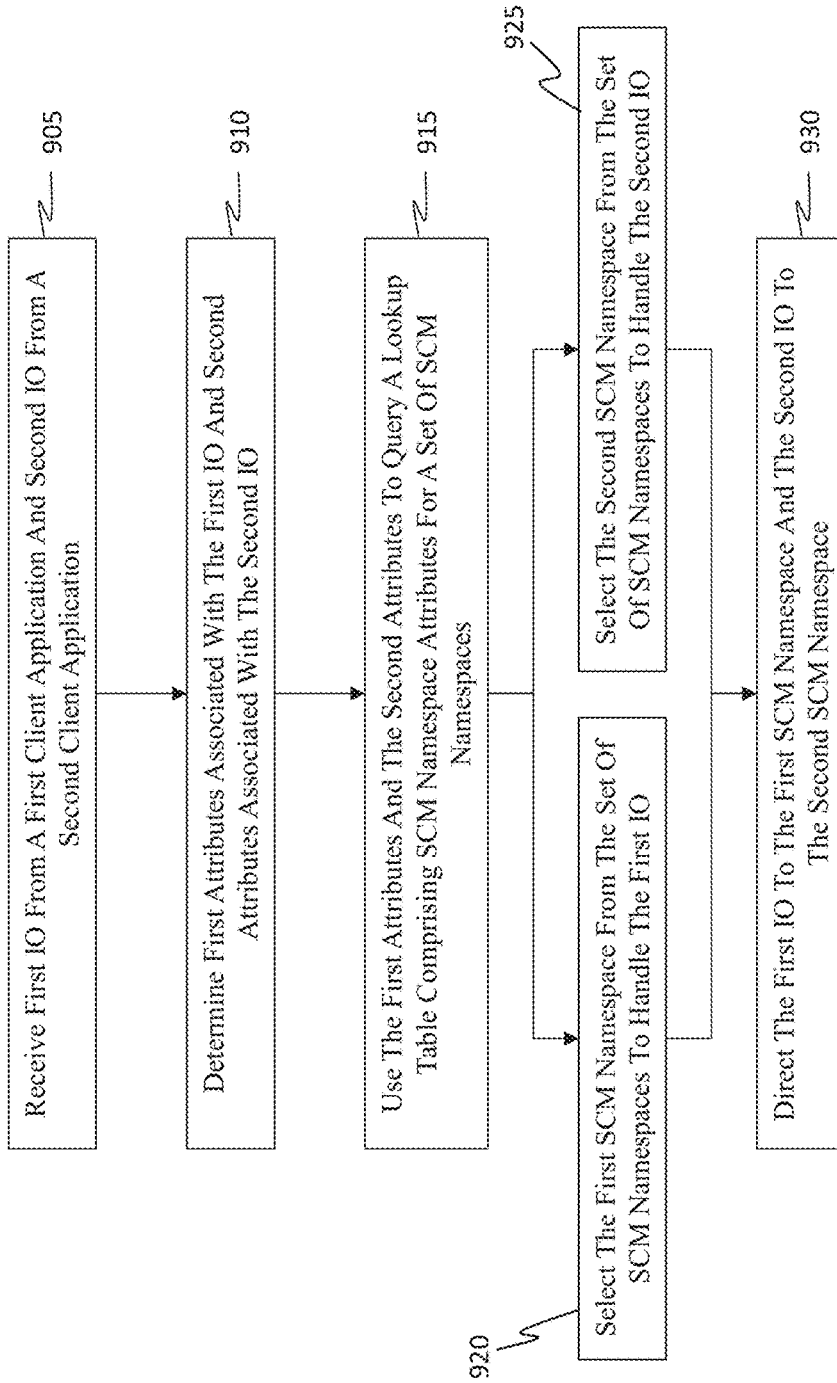
FIG. 9 illustrates a flowchart of an example method for redirecting an incoming IO to a particular SCM namespace based on a determination that the SCM namespace is optimized to handle IO having attributes that are common to attributes of the incoming network IO.
Figure 10:
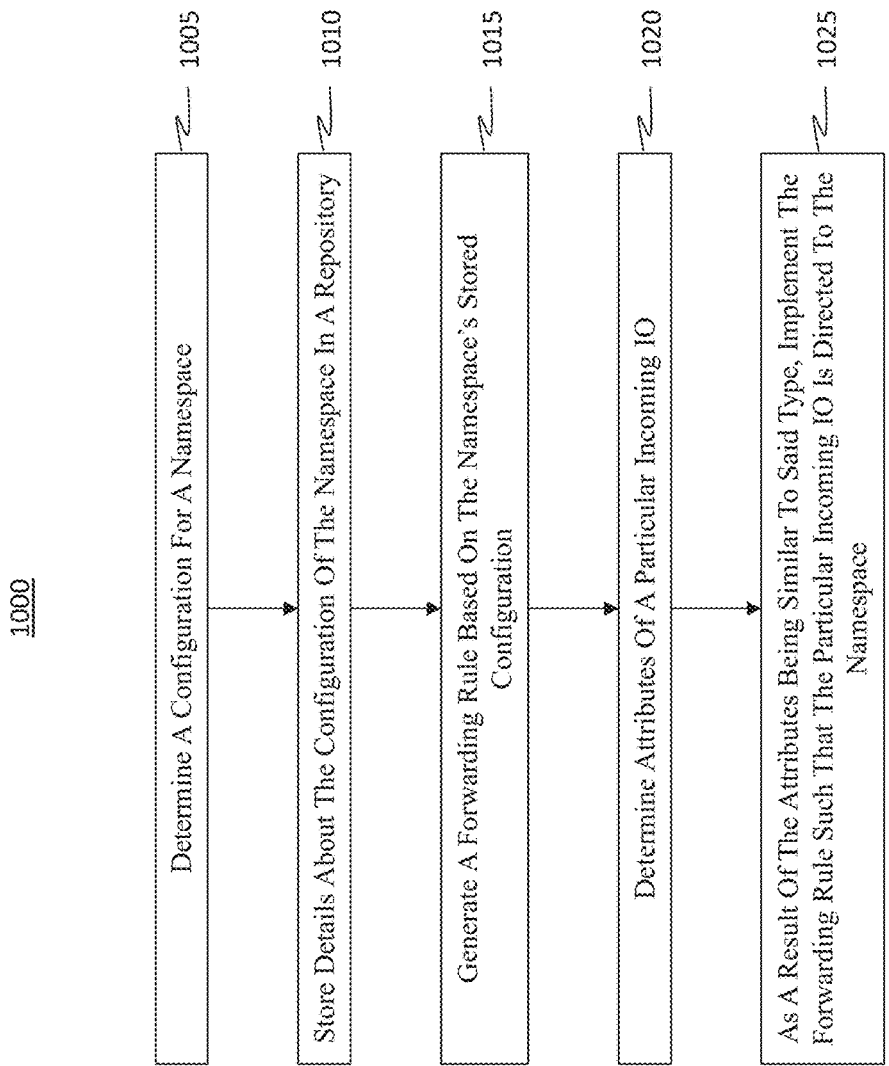
FIG. 10 illustrates another flowchart of an example method for implementing a forwarding rule to direct incoming IO to a selected namespace.

FIG. 9 illustrates a flowchart of another example method 900 for redirecting an incoming network IO to a particular SCM namespace based on a determination that the particular SCM namespace is optimized to handle IO having attributes that are common to attributes of the incoming network IO. Similar to method 800, the method 900 can be performed in the architectures 500 and 600 of FIGS. 5 and 6, respectively.

Method 900 includes an act (act 905) of receiving first IO from a first client application and second IO from a second client application. Act 910 then includes determining first attributes associated with the first IO and second attributes associated with the second IO. The first and/or second attributes can include a pattern of workload behavior for a corresponding (e.g., the first or second) client application, and the first and/or second attributes can include a size of workloads for the corresponding (e.g., the first or second) client application. In some cases, the first and/or second attributes can include one or more of: data atomicity of the first or second IO, hardware access patterns for a client device that transmitted the first and/or second IO, or a health of the client device that transmitted the IO.

The process of determining the first and/or second attributes associated with the IO (e.g., the first IO and the second IO) can be performed using a ML algorithm, which can be a Markov transition state machine learning algorithm, a convolutional neural network, a recursive neural network, and so on.

Act 915 includes using the first attributes and the second attributes to query a lookup table comprising SCM namespace attributes for a set of SCM namespaces. The process of querying the lookup table includes (i) identifying a first SCM namespace optimized to handle IO having a similar pattern of workload behavior as the pattern of workload behavior associated with the first client application and (ii) identifying a second SCM namespace optimized to handle IO having a similar size of workloads as the size of workloads associated with the second client application.

Act 920 includes selecting the first SCM namespace from the set of SCM namespaces to handle the first IO. In parallel or perhaps in serial with act 920, act 925 involves selecting the second SCM namespace from the set of SCM namespaces to handle the second IO.

In some implementations, the first SCM namespace can be associated with a first device node while the second SCM namespace can be associated with a second device node. The first device node can optionally be mounted at a different file system location (e.g., file system location 550 of FIG. 5) than a file system location where the second device node is mounted.

In some implementations, the lookup table includes information identifying the file system location (e.g., file system location 550 of FIG. 5) of the first device node. The lookup table can also optionally include information identifying the file system location of the second device node.

Act 930 includes directing the first IO to the first SCM namespace and the second IO to the second SCM namespace. For example, this directing process can be facilitated using the forwarding rule mentioned earlier. That is, the disclosed method can include generating a forwarding rule that, when implemented, automatically causes the first IO to be redirected to the first SCM namespace. A different forwarding rule can be implemented to automatically reroute or redirect the second IO to the second SCM namespace. As far as "directing," "forwarding," or "routing" (and their variants), the embodiments can modify an address or location where the IO is to go, such as perhaps by modifying header information in a packet or destination address information.

FIG. IO shows yet another example method 1000 for dynamically directing incoming IO to a best fit namespace. Similar to the other methods, method 1000 can also be performed in the disclosed architectures. Initially, method 1000 includes determining (act 1005) a configuration for a namespace, where the configuration indicates a type of IO that the namespace is structured to handle.

Act 1010 includes storing details about the configuration of the namespace in a repository. Act 1015 involves generating a forwarding rule based on the namespace's stored configuration. Notably, when incoming IO having attributes similar to that particular type is received, implementation of the forwarding rule causes the incoming IO to be directed to the namespace.

Act 1020 includes determining attributes of a particular incoming IO. As a result of the attributes satisfying a similarity threshold relative to the above-mentioned type, act 1025 includes implementing or executing the forwarding rule. As a consequence, the particular incoming IO is directed to the namespace. Optionally, the forwarding rule establishes a mapping (e.g., mapping 655 from FIG. 6) between the type of IO that the namespace is structured or optimized to handle and the attributes of the incoming IO.

Additionally, some embodiments can predict or forecast configurations. As an example, suppose that after a period of time, an IO pattern is detected. Based on that IO pattern, it might be the case that there is a prediction that the data will be written in byte mode or a prediction that the data will need to be written more quickly for future instances. In some cases, there might be a prediction regarding a desire to bypass the filesystem. Here, a DAX mode can be used to facilitate those operations. Furthermore, as IO size becomes larger, the embodiments can provide larger sized SCMs. In this sense, the embodiments can dynamically alter or modify configurations based on predictions.

The disclosed principles can be practiced in numerous different scenarios or use cases. For example, different data protection (DP) applications may have different requirements for SCM due to different IO patterns like IO size, randomness, or access mode. The disclosed embodiments can be configured to enable different namespaces using different sub parameters and modes. Those namespaces can then be assigned to corresponding applications. At the same time, even for one application, that application's requirements may change periodically. With the disclosed principles, the embodiments can dynamically forward an application's IO to a best fit namespace, even without reconfiguring SCM or service downtime.

The embodiments can also finely match SCM parameters according to incoming IO patterns so that IO completion can be faster. Some machine learning workloads use HDFS (large block size) when performing read operations in large chunks. These workloads can be placed on PMem namespaces which adhere to the respective IOPS and latency. Such operations will optimize the machine learning performance. Additionally, banks and stock trading companies are using SCM for better IO transactions. With the disclosed principles, the embodiments can use an SCM's existing configuration for best performance of customer applications without reconfiguration or power cycle, thereby resulting in higher customer satisfaction.

Accordingly, the disclosed techniques describe non-intrusive methods to estimate the current behavior of IO from network traces and statistical methods for moving data to best suitable namespaces. This automatic redirection can be referred to as "self-IO redirection," and results in the IO being moved to persistent memory namespaces. The disclosed techniques also relate to IO forwarding for namespaces, which forwarding process can consider or be aware of namespace health, namespace access characteristics, namespace load status, and even workload pattern prediction.

Example Computer/Computer Systems

Figure 11:
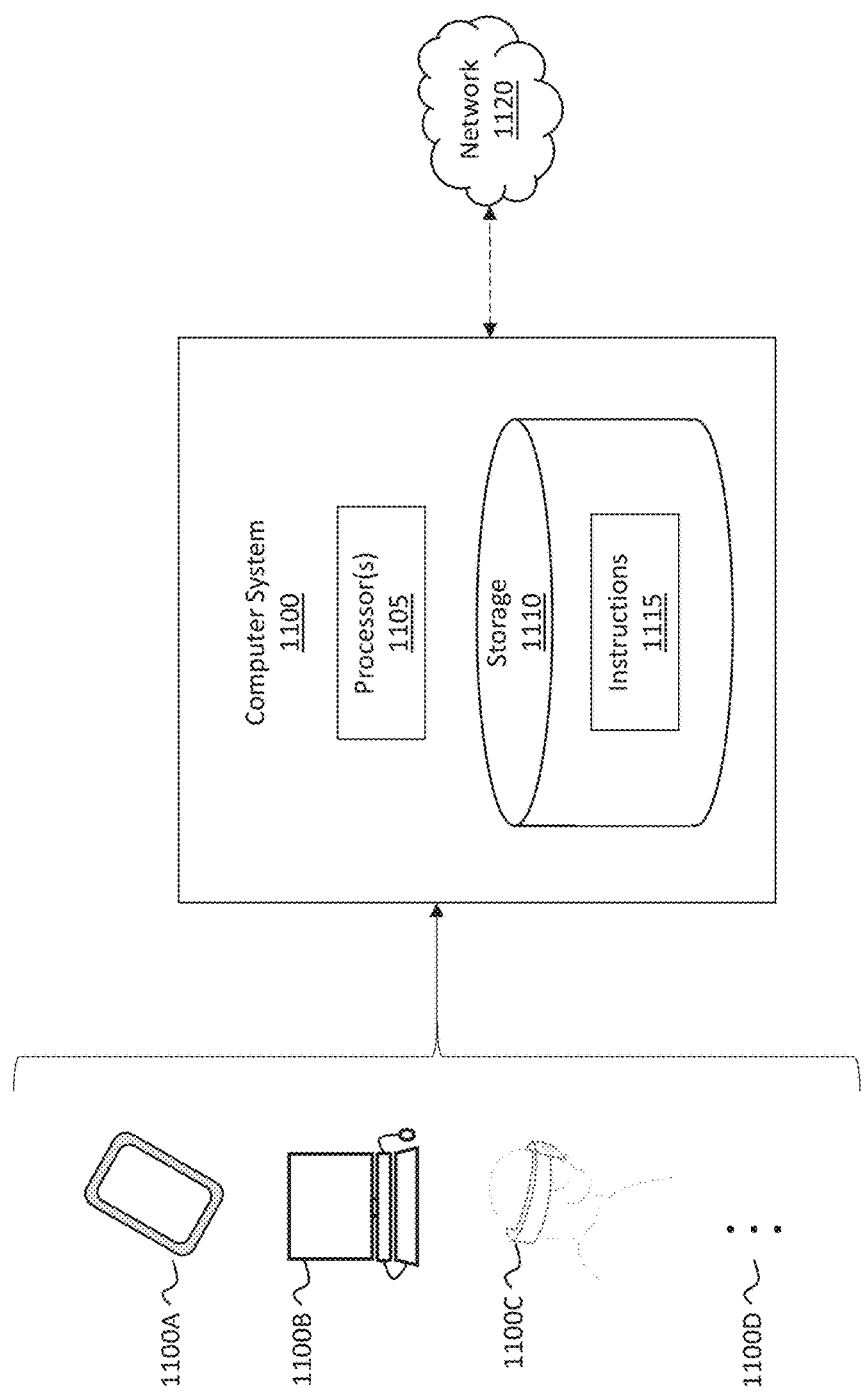
FIG. 11 illustrates an example computer system configured to perform any of the disclosed operations.

Attention will now be directed to FIG. 11 which illustrates an example computer system 1100 that may include and/or be used to perform any of the operations described herein. Computer system 1100 may take various different forms. For example, computer system 1100 may be embodied as a tablet 1100A, a desktop or a laptop 1100B, a wearable device 1100C, a mobile device, or a standalone device. The ellipsis 1100D indicates that the computer system 1100 can take on any other form as well. Computer system 1100 may also be a distributed system that includes one or more connected computing components/devices that are in communication with computer system 1100.

In its most basic configuration, computer system 1100 includes various different components. FIG. 11 shows that computer system 1100 includes one or more processor(s) 1105 (aka a "hardware processing unit") and storage 1110.

Regarding the processor(s) 1105, it will be appreciated that the functionality described herein can be performed, at least in part, by one or more hardware logic components (e.g., the processor(s) 1105). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1100. The different components, modules, engines, and services described herein may be implemented as objects or processors that execute on computer system 1100 (e.g. as separate threads).

Storage 1110 may be physical system memory, which may be volatile, non-volatile, or some combination of the two. The term "memory" may also be used herein to refer to non-volatile mass storage such as physical storage media. If computer system 1100 is distributed, the processing, memory, and/or storage capability may be distributed as well.

Storage 1110 is shown as including executable instructions 1115. The executable instructions 1115 represent instructions that are executable by the processor(s) 1105 of computer system 1100 to perform the disclosed operations, such as those described in the various methods.

The disclosed embodiments may comprise or utilize a special-purpose or general-purpose computer including computer hardware, such as, for example, one or more processors (such as processor(s) 1105) and system memory (such as storage 1110), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1100 may also be connected (via a wired or wireless connection) to external sensors (e.g., one or more remote cameras) or devices via a network 1120. For example, computer system 1100 can communicate with any number devices or cloud services to obtain or process data. In some cases, network 1120 may itself be a cloud network. Furthermore, computer system 1100 may also be connected through one or more wired or wireless networks to remote/separate computer systems(s) that are configured to perform any of the processing described with regard to computer system 1100.

A "network," like network 1120, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1100 will include one or more communication channels that are used to communicate with the network 1120. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

In view of the foregoing, the present invention may be embodied in multiple different configurations, as outlined above, and as exemplified by the following aspects.

1. A method for forwarding, in real-time, input/output (IO) to storage class memory (SCM) namespaces that are optimized to handle IO having different attributes, the method comprising:
   determining namespace attributes for each SCM namespace included in a set of SCM namespaces;
   storing the namespace attributes for each of the SCM namespaces in a database;
   in response to receiving network IO from a remote source, determining IO attributes for the network IO;
   based on the determined IO attributes for the network IO, querying the database to determine which specific SCM namespace in the set of SCM namespaces is a best fit namespace for managing incoming IO having the determined IO attributes, wherein determining which SCM namespace is the best fit to manage incoming IO having the determined IO attributes is based on a comparison between the determined IO attributes and the namespace attributes stored in the database;
   based on a result of querying the database, selecting a particular SCM namespace from the set of SCM namespaces to manage the network IO, the particular SCM namespace being selected as a result of determining the particular SCM namespace is the best fit namespace for the network IO as compared to other SCM namespaces in the set of SCM namespaces; and
   redirecting the network IO to the selected particular SCM namespace.

2. The method according to preceding Aspect 1, wherein the SCM namespaces support memory modes, storage modes, and app-direct modes.

3. The method according to preceding Aspects 1 to 2, wherein the selected particular SCM namespace is selected based on an identified workload pattern associated with a client application that provided the network IO.

4. The method according to preceding Aspects 1 to 3, wherein the incoming IO is in a form of a block.

5. The method according to preceding Aspect 4, wherein a size of the block is one of 256 bytes, 512 bytes, 1024 bytes, 2048 bytes, or 4 k bytes.

6. The method according to preceding Aspects 1 to 5, wherein the method further includes analyzing incoming IO from network traces and estimating future IO behavior using a machine learning algorithm.

7. The method according to preceding Aspect 6, wherein the machine learning algorithm is a Markov Transition State machine learning algorithm.

8. The method according to preceding Aspects 1 to 7, wherein the namespace attributes that are stored in the database include one or more of: persistent memory input/output operations per second (IOPS) for the SCM namespaces, latency for the SCM namespaces, and bandwidth for the SCM namespaces.

9. The method according to preceding Aspects 1 to 8, wherein determining which specific SCM namespace is optimized for managing incoming IO having the determined IO attributes is further based on client application behavior for a client application that transmitted the network IO.

10. The method according to preceding Aspects 1 to 9, wherein determining the IO attributes for the network IO is performed using a machine learning algorithm.

11. A method for redirecting an incoming network input/output (IO) to a particular storage class memory (SCM) namespace based on a determination that the particular SCM namespace is optimized to handle IO having attributes that are common to attributes of the incoming network IO, said method comprising:
   receiving first IO from a first client application and second IO from a second client application;
   determining first attributes associated with the first IO and second attributes associated with the second IO, wherein the first attributes include a pattern of workload behavior for the first client application, and wherein the second attributes include a size of workloads for the second client application;
   using the first attributes and the second attributes to query a lookup table comprising SCM namespace attributes for a set of SCM namespaces, wherein querying the lookup table includes (i) identifying a first SCM namespace optimized to handle IO having a similar pattern of workload behavior as the pattern of workload behavior associated with the first client application and (ii) identifying a second SCM namespace optimized to handle IO having a similar size of workloads as the size of workloads associated with the second client application; and
   selecting the first SCM namespace from the set of SCM namespaces to handle the first IO;

selecting the second SCM namespace from the set of SCM namespaces to handle the second IO; and directing the first IO to the first SCM namespace and the second IO to the second SCM namespace.

12. The method according to preceding Aspect 11, wherein determining the first attributes associated with the first IO is performed using a machine learning algorithm.

13. The method according to preceding Aspects 11 to 12, wherein the machine learning algorithm is one of a Markov transition state machine learning algorithm, a convolutional neural network, or a recursive neural network.

14. The method according to preceding Aspects 11 to 13, wherein the first SCM namespace is associated with a first device node and the second SCM namespace is associated with a second device node, and wherein the first device node is mounted at a different file system location than a file system location where the second device node is mounted.

15. The method according to preceding Aspect 14, wherein the lookup table includes information identifying the file system location of the first device node and information identifying the file system location of the second device node.

16. The method according to preceding Aspects 11 to 15, wherein the first attributes include one or more of: data atomicity of the first IO, hardware access pattern for a client device that transmitted the first IO, or health of the client device that transmitted the first IO.

17. The method according to preceding Aspects 11 to 16, wherein the method further includes generating a forwarding rule that, when implemented, automatically causes the first IO to be redirected to the first SCM namespace.

18. One or more hardware storage devices that store instructions that are executable by one or more processors of a computer system to cause the computer system to:
  determine a configuration for a namespace, wherein the configuration indicates a type of input/output (IO) that the namespace is structured to handle;
  store details about the configuration of the namespace in a repository;
  generate a forwarding rule based on the namespace's stored configuration, wherein, when incoming IO having attributes similar to said type is received, implementation of the forwarding rule causes the incoming IO to be directed to the namespace;
  determine attributes of a particular incoming IO; and
  as a result of the attributes satisfying a similarity threshold relative to said type, implement the forwarding rule such that the particular incoming IO is directed to the namespace.

19. The one or more hardware storage devices according to preceding Aspect 17, wherein determining the attributes of the particular incoming IO is performed using a machine learning algorithm.

20. The one or more hardware storage devices according to preceding Aspects 18 to 19, wherein the forwarding rule establishes a mapping between the type of IO that the namespace is structured to handle and the attributes of the particular incoming IO.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for forwarding, in real-time, input/output (IO) to storage class memory (SCM) namespaces that are optimized to handle IO having different attributes, the method comprising:
  determining, by a processor, namespace attributes for each SCM namespace included in a set of SCM namespaces;
  storing, by the processor, the namespace attributes for each of the SCM namespaces in a database;
  in response to receiving network IO from a remote source, selecting an SCM namespace that is a best fit for the network IO by comparing attributes of the network IO with the namespace attributes; and
  redirecting, by the processor, the network IO to the selected SCM namespace.

2. The method of claim 1, wherein the processor determines IO attributes for the network IO.

3. The method of claim 1, wherein selecting the SCM namespace that is the best fit for the network IO is further performed based on a query to a database using the SCM namespace as a query parameter.

4. The method of claim 1, wherein the SCM namespace supports a memory mode.

5. The method of claim 1, wherein the SCM namespace supports a storage mode.

6. The method of claim 1, wherein the SCM namespace supports an app-direct mode.

7. The method of claim 1, wherein the selected SCM namespace is selected based on an identified workload pattern associated with a client application that provided the network IO.

8. The method of claim 1, wherein the namespace attributes include a bandwidth for the SCM namespace.

9. The method of claim 1, wherein the namespace attributes include a persistent memory input/output operations per second (IOPS) for the SCM namespace.

10. The method of claim 1, wherein the namespace attributes include a latency for the SCM namespace.

11. A computer system that forwards, in real-time, input/output (IO) to storage class memory (SCM) namespaces that are optimized to handle IO having different attributes, the computer system comprising:
  one or more processors; and
  one or more hardware storage devices that store instructions that are executable by the one or more processors to cause the computer system to:
    determine namespace attributes for each SCM namespace included in a set of SCM namespaces;
    store the namespace attributes for each of the SCM namespaces in a database;
    in response to receiving network IO from a remote source, select an SCM namespace that is a best fit for the network IO by comparing attributes of the network IO with the namespace attributes; and
    redirect the network IO to the selected SCM namespace.

12. The computer system of claim 11, wherein the namespace attributes include a bandwidth for the SCM namespace.

13. The computer system of claim 11, wherein the attributes for the network IO are identified using a machine learning algorithm.

14. The computer system of claim 13, wherein the machine learning algorithm is a Markov transition state machine learning algorithm.

15. The computer system of claim 11, wherein the SCM namespace is associated with a first device node and a second SCM namespace is associated with a second device node, and wherein the first device node is mounted at a different file system location than a file system location where the second device node is mounted.

16. The computer system of claim 11, wherein selecting the SCM namespace is based on client application behavior for a client application that transmitted the network IO.

17. The computer system of claim 11, wherein the SCM namespace supports a memory mode or a storage mode.

18. The computer system of claim 11, wherein the SCM namespace supports a memory mode, a storage mode, or an app-direct mode.

19. The computer system of claim 18, wherein the SCM namespace supports all of the memory mode, the storage mode, and the app-direct mode.

20. One or more non-transitory hardware storage devices that store instructions that are executable by one or more processors to cause the one or more processors system to:
   determine namespace attributes for each SCM namespace included in a set of SCM namespaces;
   store the namespace attributes for each of the SCM namespaces in a database;
   in response to receiving network IO from a remote source, select an SCM namespace that is a best fit for the network IO by comparing attributes of the network IO with the namespace attributes; and
   redirect the network IO to the selected SCM namespace.

* * * * *